US008275819B2

(12) United States Patent
Tang et al.

(10) Patent No.: US 8,275,819 B2
(45) Date of Patent: *Sep. 25, 2012

(54) METHODS AND APPARATUS FOR PERFORMING CALCULATIONS USING REDUCED-WIDTH DATA

(75) Inventors: Ping T. Tang, Hayward, CA (US); Gopi K. Kolli, Concord, MA (US)

(73) Assignee: Marvell World Trade Ltd. (BB)

( * ) Notice: Subject to any disclaimer, the term of this patent is extended or adjusted under 35 U.S.C. 154(b) by 221 days.

This patent is subject to a terminal disclaimer.

(21) Appl. No.: 12/492,961

(22) Filed: Jun. 26, 2009

(65) Prior Publication Data

US 2009/0265408 A1   Oct. 22, 2009

Related U.S. Application Data

(60) Continuation of application No. 11/657,300, filed on Jan. 24, 2007, now Pat. No. 7,555,508, which is a division of application No. 10/726,828, filed on Dec. 3, 2003, now Pat. No. 7,457,838.

(51) Int. Cl.
*G06F 1/00* (2006.01)

(52) U.S. Cl. .................................................... 708/270

(58) Field of Classification Search ........... 708/270–277
See application file for complete search history.

(56) References Cited

U.S. PATENT DOCUMENTS

| | | | |
|---|---|---|---|
| 4,905,177 A | 2/1990 | Weaver et al. | |
| 5,179,659 A | 1/1993 | Lien et al. | |
| 5,245,564 A | 9/1993 | Quek et al. | |
| 5,280,439 A | 1/1994 | Quek et al. | |
| 5,321,642 A | 6/1994 | Goldberg | |
| 5,459,680 A | 10/1995 | Zimmerman et al. | |
| 5,703,801 A | 12/1997 | Pan et al. | |
| 5,774,082 A | 6/1998 | Chu et al. | |
| 5,963,460 A | 10/1999 | Rarick | |
| 6,058,211 A | 5/2000 | Bormans et al. | |
| 2002/0062206 A1 | 5/2002 | Liebchen | |
| 2003/0037081 A1 | 2/2003 | Vergel | |
| 2004/0139133 A1 | 7/2004 | Yang et al. | |

FOREIGN PATENT DOCUMENTS

JP    03225420    10/1991

OTHER PUBLICATIONS

Examination Report for European Patent Application No. 04 811 444.1 dated Mar. 31, 2010, (4 pgs.).
Chinese Office Action for Chinese Patent Application No. 2004/80036215.3 dated Aug. 28, 2008 (Translation).
European Examination Report for European Patent Application No. 04811444.1-1229 dated Oct. 6, 2008.
M.J.D. Powell. "Approximation Theory and Methods." Cambridge University Press, May 1981. pp. 85-95. ISBN: 0521295149.
"IEEE Standard for Binary Floating-Point Arithmetic." ANSI/IEEE Standard 754-1985. Published by The Institute of Electrical and Electronics Engineers, Inc., New York, New York. 1985.

(Continued)

*Primary Examiner* — Tan V Mai

(57) ABSTRACT

Methods, apparatus, and articles of manufacture for performing calculations using reduced-width data are disclosed. In particular, an example method determines reduced-width data values associated with generating and evaluating functions. Some of the reduced-width data values are stored within instructions in an instruction memory during a compile phase and retrieved from instruction memory during a runtime phase.

20 Claims, 7 Drawing Sheets

OTHER PUBLICATIONS

Ping Tak Peter Tang. "Table-lookup Algorithms for Elementary Functions and Their Error Analysis." Proceedings of the 10$^{th}$ Symposium on Computer Architecture, pp. 232-236. Grenoble, 1991.

Cornea-Hasegan, M; Norin B. "IA-64 Floating-point Operations and the IEEE Standard for Binary Floating-point Arithmetic." Intel Technology Journal Q4, 1999. http://www.intel.com/technology/itj/q41999/pdf.pdf.

International Searching Authority, "Partial International Search Report", PCT/US2004/038731, Jun. 3, 2005 (5 Pages).

International Search Report corresponding to International Application No. PCT/US2004/038731, Dec. 23, 2005, 5 sheets.

Written Opinion corresponding to International Application No. PCT/US2004/038731, Dec. 23, 2005.

International Preliminary Report on Patentability corresponding to International Patent Application Serial No. PCT/US2004/038731, mailed Jun. 15, 2006, 8 pages.

METHODS AND APPARATUS FOR PERFORMING CALCULATIONS USING REDUCED-WIDTH DATA

CROSS-REFERENCES TO RELATED APPLICATIONS

This application is a continuation application of commonly-assigned U.S. patent application Ser. No. 11/657,300, filed Jan. 24, 2007, which is a divisional application claiming the benefit under 35 U.S.C. 120 of U.S. patent application Ser. No. 10/726,828 (now U.S. Pat. No. 7,457,838), filed on Dec. 6, 2003, the contents of both of which are hereby incorporated by reference in their entirety.

FIELD OF THE DISCLOSURE

The present disclosure relates generally to processor systems and, more particularly, to methods, apparatus, and articles of manufacture for performing calculations using reduced-width data.

BACKGROUND

Algebraic and transcendental functions are fundamental in many fields of application. For example, the evaluation of trigonometric functions such as the sine and cosine functions is critical to the performance of many graphics applications. Traditional algebraic and/or transcendental function evaluation algorithms generally provide results having relatively high precision and accuracy ranging from approximately seven significant decimals (e.g., IEEE single precision floating point) to sixteen significant decimals (e.g., IEEE double precision floating point).

Due to precision and accuracy requirements, traditional algebraic and/or transcendental function evaluation algorithms typically rely heavily on data memory accesses. Implementing these traditional algorithms often involves storing, in data memory, a value table containing pre-determined values such as, for example, pre-determined polynomial coefficient values. During runtime, execution of the traditional algorithms often requires multiple data memory accesses to retrieve the pre-determined values from the value table. The multiple data memory accesses impose a relatively large load on a data bus. Additionally, frequent accesses to data memory often leads to thrashing the data cache because each new data element retrieved from the data memory may be stored in the data cache thereby overwriting other data elements that may be required in a future retrieval.

The traditional algorithms used to evaluate algebraic and transcendental functions are typically configured to be executed on desktop (e.g., PC) and workstation platforms. In general, executing the traditional algorithms on desktop and workstation platforms is not a problem because these platforms are typically configured to include relatively large main memories, data path widths, and data cache sizes. Therefore, the relatively large loads imposed on a data bus or data buses by the data memory accesses associated with these traditional algorithms typically have a relatively low impact on overall system performance.

The need for precise and accurate evaluations of algebraic and transcendental functions exists beyond the desktop and workstation platforms. For example, the need to evaluate algebraic and transcendental functions also exists for mobile platforms such as those using mobile processors (e.g., the Intel® XScale® family of microprocessors). However, the traditional algebraic and/or transcendental function evaluation algorithms described above are generally unsuitable for execution on many mobile platforms. Data memory accesses required to retrieve pre-determined values from a value table often lead to low and unpredictable performance due to typical mobile platform processor characteristics such as, for example, reduced data path widths and data cache sizes. The reduced data path widths may require multiple accesses to retrieve a single pre-determined value that has a data width larger that the available data path width. In addition, the reduced data cache sizes result in the data cache being overwritten and/or filled almost entirely by newly retrieved data, thereby imposing the need to retrieve data from data memory more frequently.

A value table containing pre-determined values may result in further drawbacks to a mobile platform. For example, the value table may be relatively large and require a significant amount of memory, thereby limiting the amount of memory available to applications and/or other processes of the mobile platform. Additionally, the value table may impose a large memory footprint requirement on the mobile platform, which may increase the size and cost of an overall mobile platform-based system design.

DETAILED DESCRIPTION

Figure 1:
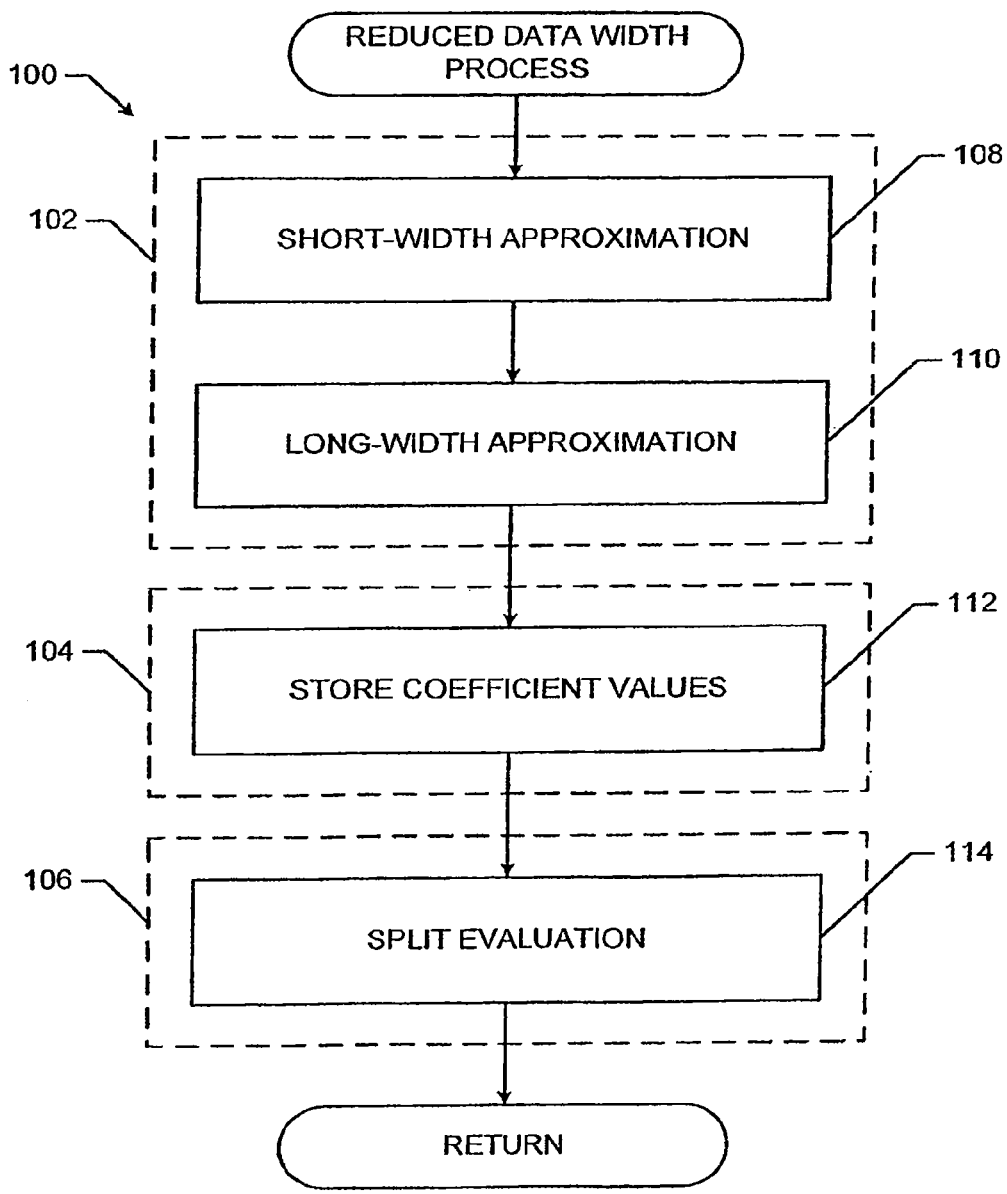
FIG. 1 is a flow diagram of an example method or process that may be used to evaluate functions using reduced-width data.

FIG. 1 is a flow diagram of an example method or process 100 that may be used to evaluate functions using reduced-width data. The example process 100 may be implemented using hardware (e.g., the example system 600 of FIG. 6) and/or software stored on a machine accessible medium and executed on a processor system such as, for example, the processor system 710 of FIG. 7. Alternatively, any desired combination of hardware and/or software may be used instead.

In general, the methods described below may be used to evaluate functions that include transcendental functions, algebraic functions, and polynomials, which include approximating polynomials that approximate, for example, the transcendental functions and/or algebraic functions. Transcendental functions and algebraic functions are well known in the art and include, for example, sin(x), cos(x), square-root functions, etc.

As described herein, reduced-width data is generally associated with numerical values that are represented using a reduced amount of data. For example, a 32-bit value may be rounded or truncated to generate a reduced-width value having sixteen bin. Additionally or alternatively, a 32-bit value may be split into a plurality of shorter reduced-width values such as, for example, two 16-bit values. Evaluating functions using reduced-width data provides substantial advantages over traditional function evaluation methods. For example, reduced-width data values may be stored within instructions in instruction memory during a compile phase, thereby reducing the number of accesses to data memory during a runtime phase. Reducing the number of data memory accesses increases the performance of a processor system (e.g., the processor system 710 of FIG. 7) by reducing the number of times the data cache is overwritten. As a result, data values that are used more often remain in the data cache without consuming processor cycles to refresh or restore the data values.

In general, instead of being stored in data memory, data values may be stored in instruction memory as immediate data values. For example, if an addition instruction adds two operands or data values during a runtime phase, at least one of the operands may be stored in the addition instruction as an immediate data value as long as the operand has a small enough value (i.e., the number of data bits representing the operand is small enough). Several processors available today such as, for example, the Intel® XScale® processor, enable immediate data values to be stored in instructions. Immediate data values are often restricted to short-width data values such as, for example, 8-bit values or 16-bit values. Instructions having immediate data values may be written, for example, in an assembly language instruction as shown below.

ADD U, X, #166

During a compile phase, the immediate data value 166 is stored in a bitfield associated with the addition instruction in instruction memory. During a runtime phase, retrieving the addition instruction also causes the immediate data value 166 to be retrieved.

Reduced-width data values also enable the use of instructions that consume a relatively small number of processor cycles (e.g., short instructions). Some processors are configured to execute short instructions configured to perform, for example, 8-bit or 16-bit operations, and long instructions configured to perform, for example, 32-bit operations. Typically, short instructions consume fewer processor cycles than long instructions. Evaluating a mathematical function using only long instructions may result in poor performance compared to the performance achieved by using at least some short instructions.

Reduced-width data values may enable the use of more (or only) short instructions, which may result in faster and more efficient data processing. However, reducing the data width of values used to evaluate mathematical functions may lead to loss of precision and accuracy. The methods described herein may be used to achieve substantially accurate and precise results using reduced-width data values.

Figure 7:
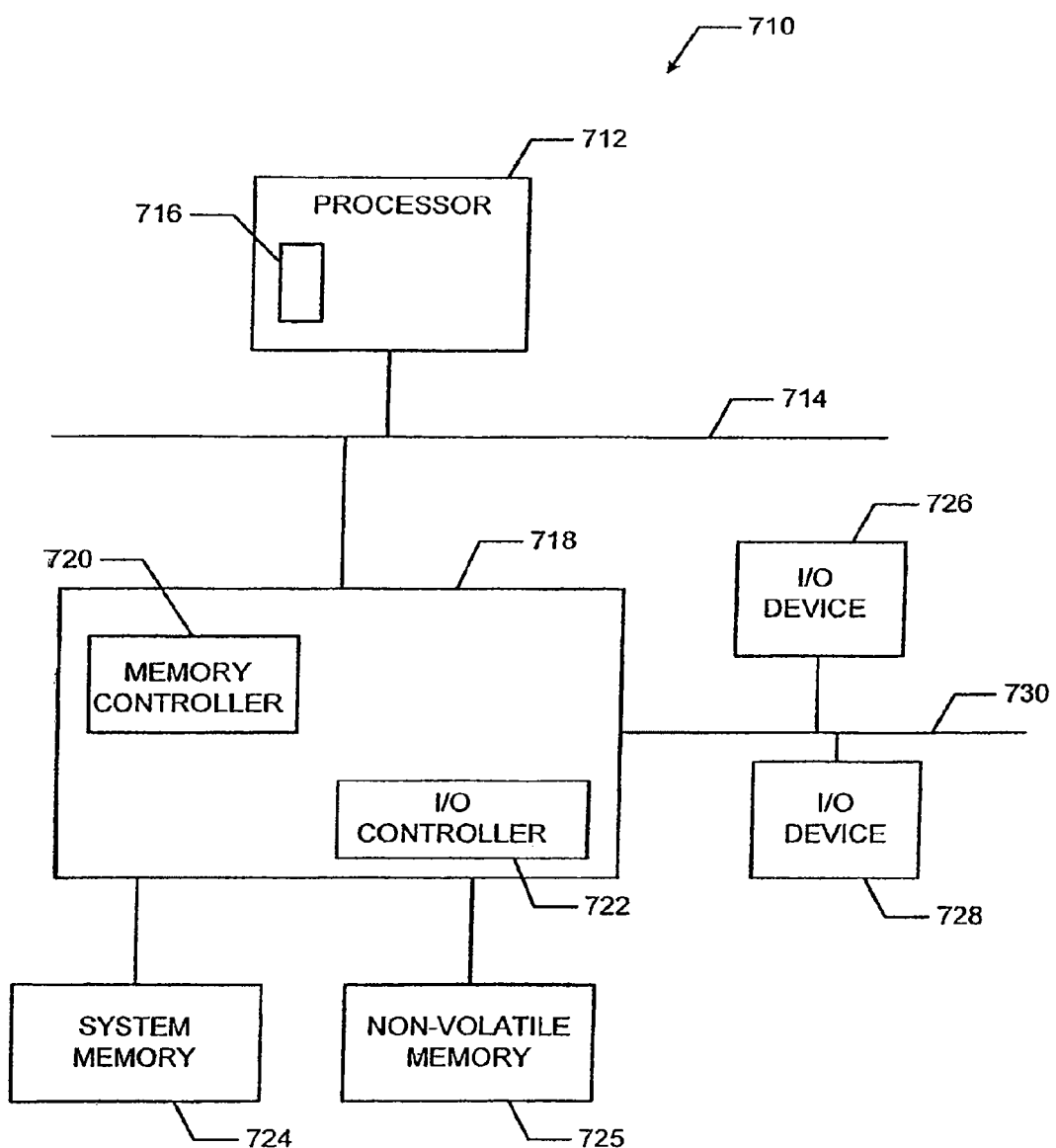
FIG. 7 is a block diagram of an example processor system that may be used to implement the apparatus, methods, and articles of manufacture described herein.

Now turning in detail to FIG. 1, the example process 100 includes a design phase 102, a compile phase 164, and a runtime phase 106. The design phase 102 occurs prior to the compile phase 104 and is associated with the time at which a programmer or a software developer generates (e.g., writes) software and/or firmware (e.g., machine accessible and executable code or instructions). The programmer or software developer may be a person. Alternatively or additionally, the software and/or firmware may be generated by an application executed on the processor system 710 (FIG. 7). The machine accessible code or instructions may be written in any programming language such as, for example, C/C++, Basic, Java, Assembler, etc. Additionally, the code may be written to implement machine executable routines that cause a processor (e.g., the processor 712 of FIG. 7) to evaluate mathematical functions as described in greater detail below. In particular, using the example methods described herein, the code may enable the processor system 710 to evaluate functions using reduced-width data values. As described in greater detail below, the design phase 102 includes a short-width approximation process 108 and a long-width approximation process 110.

The short-width approximation process 108 and the long-width approximation process 110 may be used in combination during a design phase to generate mixed-width polynomials that include approximating polynomials. As described in greater detail in connection with FIG. 2, approximating polynomials are used to approximate more complicated mathematical functions such as, for example, transcendental and/or algebraic functions. An example approximating polynomial $p_a(x)$ is shown in Equation 1 below.

$$p_a(x) = p_0 + p_1 \cdot x + p_2 \cdot x^2 + \ldots + p_{N-1} \cdot x^{N-1} + p_N \cdot x^N \quad \text{Equation 1}$$

As show in Equation 1, the approximating polynomial $p_a(x)$ includes an input argument variable x and a plurality of coefficient values $p_0$, $p_1$, $p_2$, $p_{N-1}$, and $p_N$, where N is associated with the highest-degree term and '0' is associated with a zeroth-term or a constant term. As is well known, the approximating polynomial may have any number of terms and may be generated using a minimax approximation method and/or an optimization method such as, for example, the Remez algorithm.

In general, mixed-width polynomials include reduced-width coefficient values having at least some short-width coefficient values (e.g., 8-bit or 16-bit values) and at least some long-width coefficient values (e.g., a 32-bit value). As described in greater detail in connection with FIGS. 3 and 4 below, the reduced-width coefficient values are generated by identifying a set of coefficient values associated with a polynomial and reducing the data width (e.g., rounding, truncating, etc.) of at least some of the coefficient values.

The compile phase 104 is associated with a time at which the code generated during the design phase 102 is formatted into processor-specific machine code by a compiler application executed on a processor system (e.g., the processor system 710 of FIG. 7). The machine code generated by a compiler is a processor-specific language that includes an elemental set of codes or binary strings that represent particular processor operations. The elemental set of codes or binary strings are interpreted by a specific type (e.g., brand, model, etc.) of machine or processor (e.g., the processor 712 of FIG. 7).

As is known, a compiler converts programming language code into processor-specific machine code by converting programming language instructions and associated data (e.g., immediate data values) to machine code and storing the converted machine code in a memory. In this manner, during the runtime phase 106, the processor 712 may perform or execute the operations specified by the programmer or software developer based on the converted machine code.

The store coefficient values process 112 is typically performed during the compile phase 104 and may be used to store coefficient values (e.g., the reduced-width coefficient values generated during the design phase 102) in a memory associated with the processor system 710 (FIG. 7). More specifically, as described in greater detail below in connection with FIG. 4, the reduced-width coefficient values may be stored in instruction memory.

During the runtime phase 106, the processor 712 (FIG. 7) executes the machine code compiled during the compile phase 104. As shown in FIG. 1, the runtime phase 106 is separate from the design phase 102 and the compile phase 104. However, the runtime phase 106 may include the design phase 102 and the compile phase 104. For example, the processes of the design phase 102 (e.g., the short-width approximation process 108 and the long-width approximation process 110), the processes of the compile phase 104 (e.g., the store coefficient values process 112), and any process(es) of the runtime phase 106 may be configured to be performed by the processor system 710 (FIG. 7) in the same runtime environment such as, for example, the runtime phase 106.

The example runtime phase 106 includes a split evaluation process 114. The split evaluation process 114, as described in greater detail in connection with FIG. 4, may be used to evaluate functions such as, for example, polynomials. More specifically, the split evaluation process 114 may be used to split or parse an input argument value into a plurality of shorter argument values or reduced-width argument values and evaluate a function based on the plurality of reduced-width argument values and short instructions. Furthermore, the function may be evaluated as a plurality of evaluations using short instructions resulting in a faster and more efficient evaluation process. In addition, while the split evaluation process 114 may be implemented in combination with the reduced-width coefficient values identified in connection with the processes 108 and 110, as shown in FIG. 1, the split evaluation process 114 may alternatively be implemented independent of the example processes 108 and 110.

Figure 2:
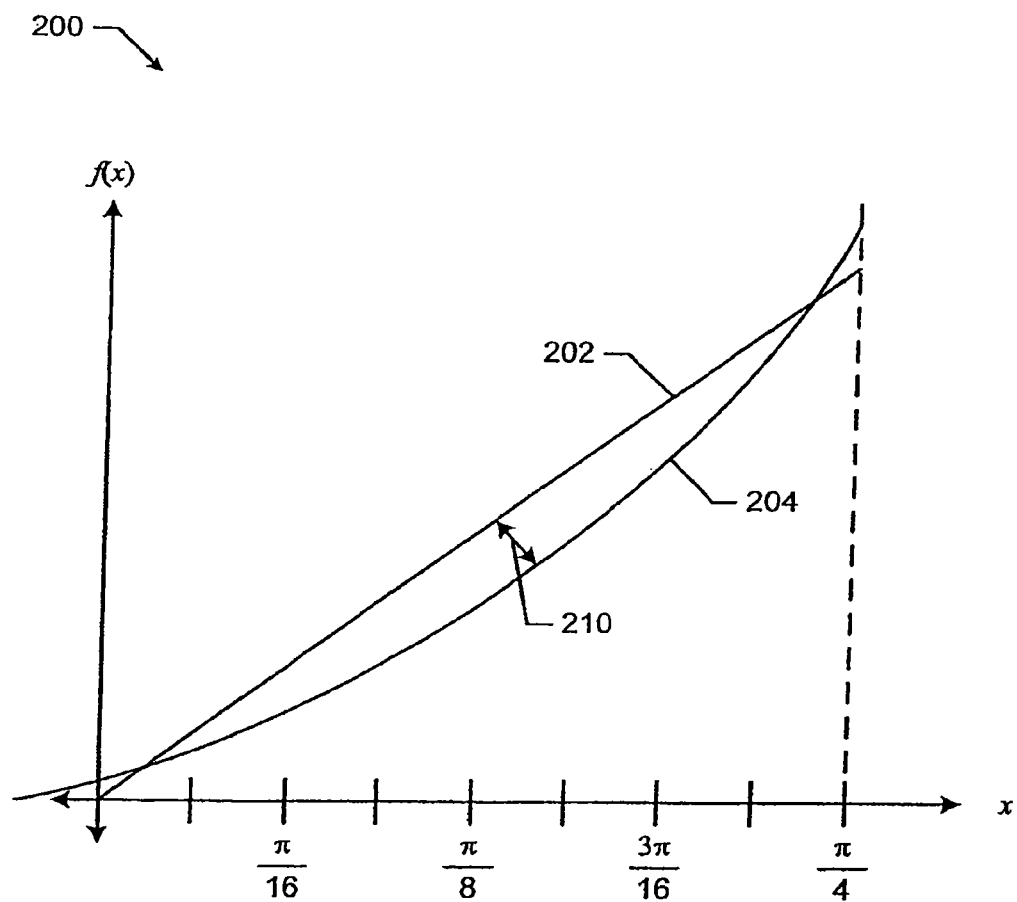
FIG. 2 is a plot of an example approximation comparison that may be used to minimize the maximum deviation between a target function and an approximating polynomial.

FIG. 2 is a plot of an example approximation comparison 200 that may be used to minimize the maximum deviation between a target function and an approximating polynomial that approximates the target function. The target function may include a transcendental function and/or an algebraic function and may be evaluated using approximating polynomials. Typically, processor systems such as, for example, the processor system 710 of FIG. 7, evaluate transcendental and/or algebraic target functions using approximating polynomials that can be more quickly and efficiently processed than the target function. In general, within a specified range of input argument values, the approximating polynomial typically provides a mathematical evaluation that is substantially characteristic and representative of the target function. For example, over an input argument value range of x=[a,b], the transcendental function sin(x) may be approximated using an approximating polynomial having the form of the approximating polynomial $p_a(x)$ shown in Equation 1 above.

The example approximation comparison 200 includes plots of a target function $f_t(x)$ 202 and a target approximation polynomial $p_t(x)$ 204 evaluated in terms of an input argument variable x over an evaluation range $$x = \left[0, \frac{\pi}{4}\right].$$

The target approximating polynomial $p_t(x)$ 204 is generated so that a maximum deviation 210 between the evaluation of the target function $f_t(x)$ and the evaluation of the target approximating polynomial $p_t(x)$ is minimized within the evaluation range. In general, the value of the maximum deviation 210 is based on the selection of the approximating coefficient values of the approximating polynomial (e.g., the coefficient values $p_0$, $p_1$, $p_2$, etc. shown in Equation 1). An acceptable maximum deviation may be based on an accuracy requirement for a particular application and may, for example, be selected during the design phase 102 (FIG. 1). Additionally, the achievable accuracy of an approximating polynomial is generally based on the number of polynomial coefficient values used to perform the approximation.

Selecting suitable approximating polynomial coefficient values may involve multiple iterations of generating approximating polynomials and comparing the evaluations of the approximating polynomials to the evaluation of the target function over a given input argument evaluation range as shown in FIG. 2 by the plot of the target function $f_t(x)$ 202 and the target approximating polynomial $p_t(x)$ 204.

The accuracy of the target approximating polynomial $p_t(x)$ 204 may also be associated with the number of bits used to approximate the target function $f_t(x)$ 202. For example, it may be desirable to approximate the target function $f_t(x)$ 202 to sixteen bits of accuracy. In that case, approximating coefficient values are selected to enable a 16-bit accurate approximation.

Figure 3:
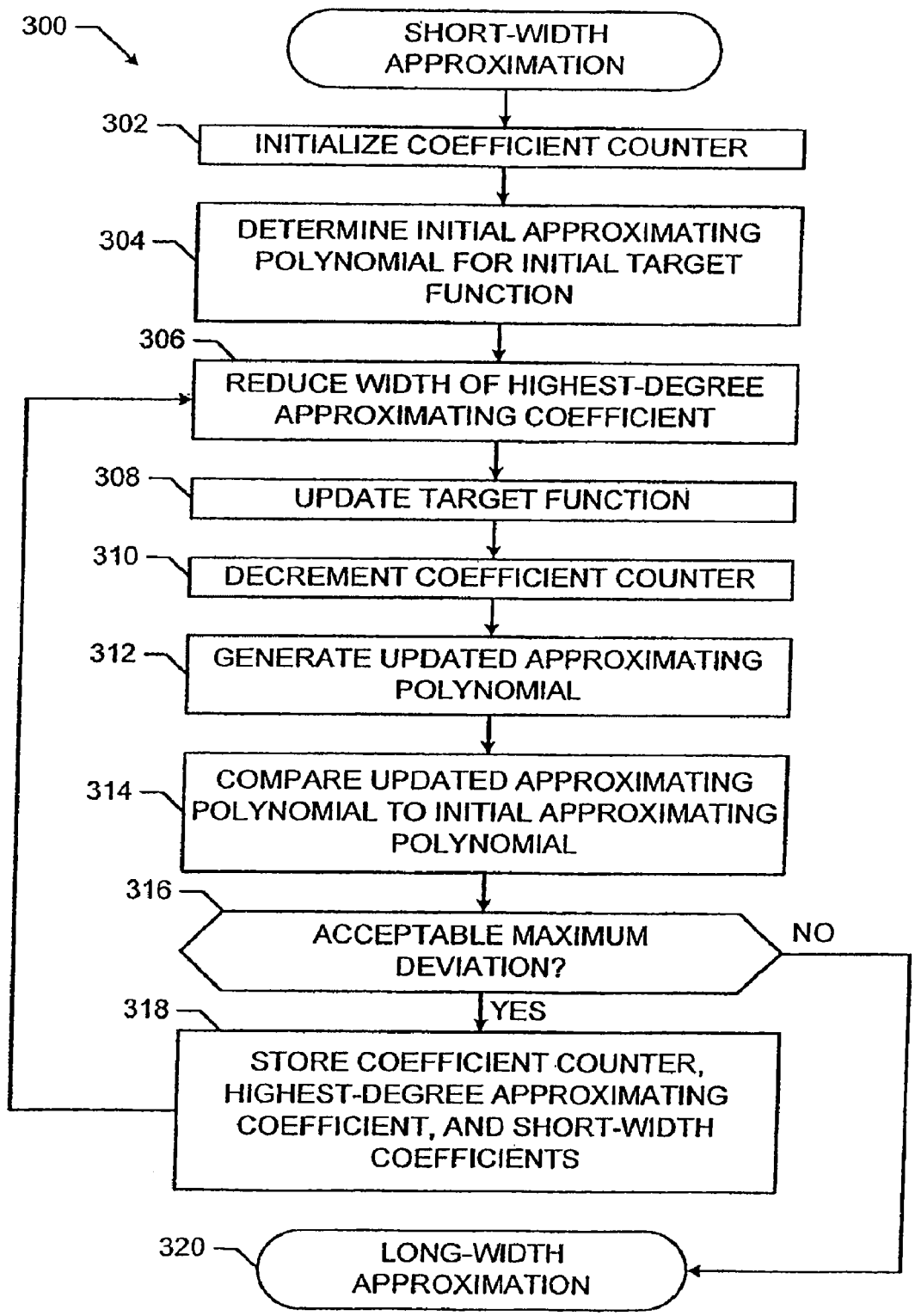
FIG. 3 is a flow diagram of an example short-width approximation method or process that may be used to generate short-width coefficient values associated with a polynomial.

FIG. 3 is a flow diagram of an example short-width approximation method or process 300 that may be used to generate short-width coefficient values associated with a polynomial. The example short-width approximation process 300 is substantially similar or identical to the short-width approximation process 108 of FIG. 1 and may be implemented using hardware (e.g., the example system 600 of FIG. 6) and/or software stored on a machine accessible medium (e.g., a computer accessible medium) and executed on a processor system such as, for example, the processor system 710 of FIG. 7. In general, the example short-width approximation process 300 may be used to identify a plurality of coefficient values associated with a polynomial and determine at least one short-width coefficient value based on at least one of the plurality of coefficient values. The polynomial may be an approximating polynomial having approximating coefficient values as described in connection with FIG. 2 above. As described in greater detail below, short-width coefficient values are generated by reducing the data width of approximating coefficient values so that the short-width coefficient values may be stored as immediate data values in instruction memory and/or to enable the use of short instructions during a runtime phase (e.g., the runtime phase 106 of FIG. 1).

Now turning in detail to FIG. 3, a coefficient counter $C_m$ is initialized (block 302). The coefficient counter $C_m$ is set equal to a highest-degree value m, which specifies the highest-degree approximating coefficient value to be generated for an initial approximating polynomial $p_{si}(x)$. For example, if the coefficient counter $C_m$ is set equal to five, a fifth-degree approximating polynomial may be generated having a highest-degree coefficient value in a fifth-degree term (e.g., $p_5 \cdot x^5$).

An initial approximating polynomial $p_{si}(x)$ that approximates an initial target function $f_i(x)$ is generated (block 304). The initial target function $f_i(x)$ is defined in terms of the input argument variable x and may be a transcendental or an algebraic function such as, for example, sin(x). The initial approximating polynomial $p_{si}(x)$ having the form of the approximating polynomial $p_a(x)$ of Equation 1 above is shown in Equation 2 below.

$$p_{si}(x) = p_0 + p_1 \cdot x + p_2 \cdot x^2 + \ldots + p_{m-1} \cdot x^{m-1} + p_m \cdot x^m \qquad \text{Equation 2}$$

As shown in Equation 2, the initial approximating polynomial $p_{si}(x)$ is an $m^{th}$-degree polynomial having a highest-degree approximating coefficient specified by the highest-degree value m.

The data width of the approximating coefficient value that is specified by the coefficient counter $C_m$ is reduced (block 306). For example, if the coefficient counter $C_m$ is equal to the highest-degree value m, a short-width coefficient value $P'_m$ is generated by reducing the data width of the approximating coefficient value $p_m$. Any operation for reducing the data width of a value may be used to generate the short-width coefficient value $p'_m$ such as, for example, rounding, truncating, etc.

An updated target function $f_{su}(x)$ is then generated based on the initial target function $f_i(x)$ and a short-width coefficient term (e.g., $p'_m \cdot x^m$) (block 308). In particular, the short-width coefficient term $p'_m \cdot x^m$ is generated by raising the input argument variable x to the power of the value of the coefficient counter $C_m$ (i.e., $x^m$) and multiplying the result by the short-width coefficient value $p'_m$. The updated target function $f_{su}(x)$ is then generated by subtracting the short-width coefficient term $p'_m \cdot x^m$ from the initial target function $f_i(x)$ as shown in Equation 3 below-Equation $$f_{su}(x) = f_i(x) - p'_m \cdot x^m = \sin(x) - p'_m \cdot x^m \qquad \text{Equation 3}$$

As shown in Equation 3, the function sin(x) represents the initial target function $f_i(x)$ and the updated target function $f_{su}(x)$ is the transcendental function sin(x) minus the short-width coefficient term $p'_m \cdot x^m$.

The coefficient counter $C_m$ is decremented by one (i.e., m−1) to indicate the degree of the next highest-degree approximating coefficient value (e.g., $p_{m-1}$) (block 310). An updated approximating polynomial $p_{su}(x)$ is then generated based on the coefficient counter $C_m$, the updated target function $f_{su}(x)$, and any short-width coefficient values that have been generated such as, for example, the short-width coefficient value $p'_m$ (block 312). The updated approximating polynomial $p_{su}(x)$ is generated by generating a current approximating polynomial that approximates the updated target function $f_{su}(x)$ and adding the short-width coefficient term $p'_m \cdot x^m$ to the current approximating polynomial. The degree of the current approximating polynomial is specified by the value of the coefficient counter $C_m$ (e.g., $p_{m-1}$). For example, if the previously determined approximating polynomial is a fifth-degree polynomial, the current approximating polynomial will be a fourth-degree polynomial. The updated approximating polynomial $p_{su}(x)$ includes the current approximating polynomial added to the short-width coefficient term $p'_m \cdot x^m$ as shown in Equation 4 below.

$$p_{su}(x) = p_0 + p_1 \cdot x + p_2 \cdot c^2 + \ldots + p_{m-1} \cdot x^{m-1} + p'_m \cdot x^m \qquad \text{Equation 4}$$

The updated approximating polynomial $p_{su}(x)$ is generated based on the updated target function $f_{su}(x)$ because the evaluation of the updated target function $f_{su}(x)$ is compensated by the subtraction of the short-width coefficient terms from the initial target function $f_i(x)$. Thus, the approximating coefficient values of the updated approximating polynomial $p_{su}(x)$ are generated based on the initial target function $f_i(x)$ and the compensation factor introduced by the subtraction of the short-width coefficient terms so that an accurate approximation of the initial target function $f_i(x)$ is achieved by the updated approximating polynomial $p_{su}(x)$ and the initial target function $f_i(x)$.

The updated approximating polynomial $p_{su}(x)$ is compared to the initial target function $f_i(x)$ (block 314). In general, the comparison is made to determine if the evaluation of the updated approximating polynomial $p_{su}(x)$ is relatively accurate compared to the evaluation of the initial target function $f_i(x)$. The comparison of the updated approximating polynomial $p_{su}(x)$ and the initial target function $f_i(x)$ may be substantially similar to the comparison of the target function $f_t(x)$ and the target approximating polynomial $p_t(x)$ as described in connection with FIG. 2 above.

An analysis is made of the comparison between the updated approximating polynomial $p_{su}(x)$ and the initial target function $f_i(x)$ to determine if the accuracy of the updated approximating polynomial $p_{su}(x)$ is acceptable (block 316). If the accuracy is acceptable, the value of the coefficient counter $C_m$ and any short-width coefficient values (e.g., $p'_m$) are stored in memory (block 318). Control is then passed to block 306 at which the width of the next highest-degree approximating coefficient value is then reduced (e.g., $p'_{m-1} = \text{RND}(p_{m-1})$) (block 306).

If at block 316, the accuracy is not acceptable, the previously generated short-width coefficient value is discarded, and the value of the coefficient counter $C_m$ and any short-width coefficient values stored in memory (if any) are passed to a long-width approximation process (block 320). For example, if after several iterations of the short-width approximation process 300, three of the approximating coefficient values (e.g., $p_{m-2}, p_{m-1}, p_m$) of the initial approximating polynomial $p_{si}(x)$ are reduced to short-width coefficient values (e.g., $p'_{m-2}, p'_{m-1}, p'_m$), and reduction of the next highest-degree approximating coefficient value (e.g., $p_{m-3}$) to a short-width representation would result in an unacceptable maximum deviation (e.g., the maximum deviation 210 of FIG. 2) at block 316, the short-width coefficient values are passed to the long-width approximation process (block 320).

Thus, the processes of blocks 306, 308, 310, 312, 314, 316, and 318 may be repeated until the accuracy of the updated approximating polynomials is not acceptable. Accordingly, a plurality of updated target functions $f_{su}(x)$ and updated approximating polynomials $p_{su}(x)$ may be generated during the short-width approximation process 300. For example, a plurality of updated target function $f_{su}(x)$ may be generated according to Equations 5 below until the accuracy of the updated approximating polynomials is not acceptable.

$$f_{si}(x) = f_i(x) - \ldots - p'_{m-2} \cdot x^{m-2} - p'_{m-1} \cdot x^{m-1} - p'_m \cdot x^m \qquad \text{Equation 5}$$

Figure 4:
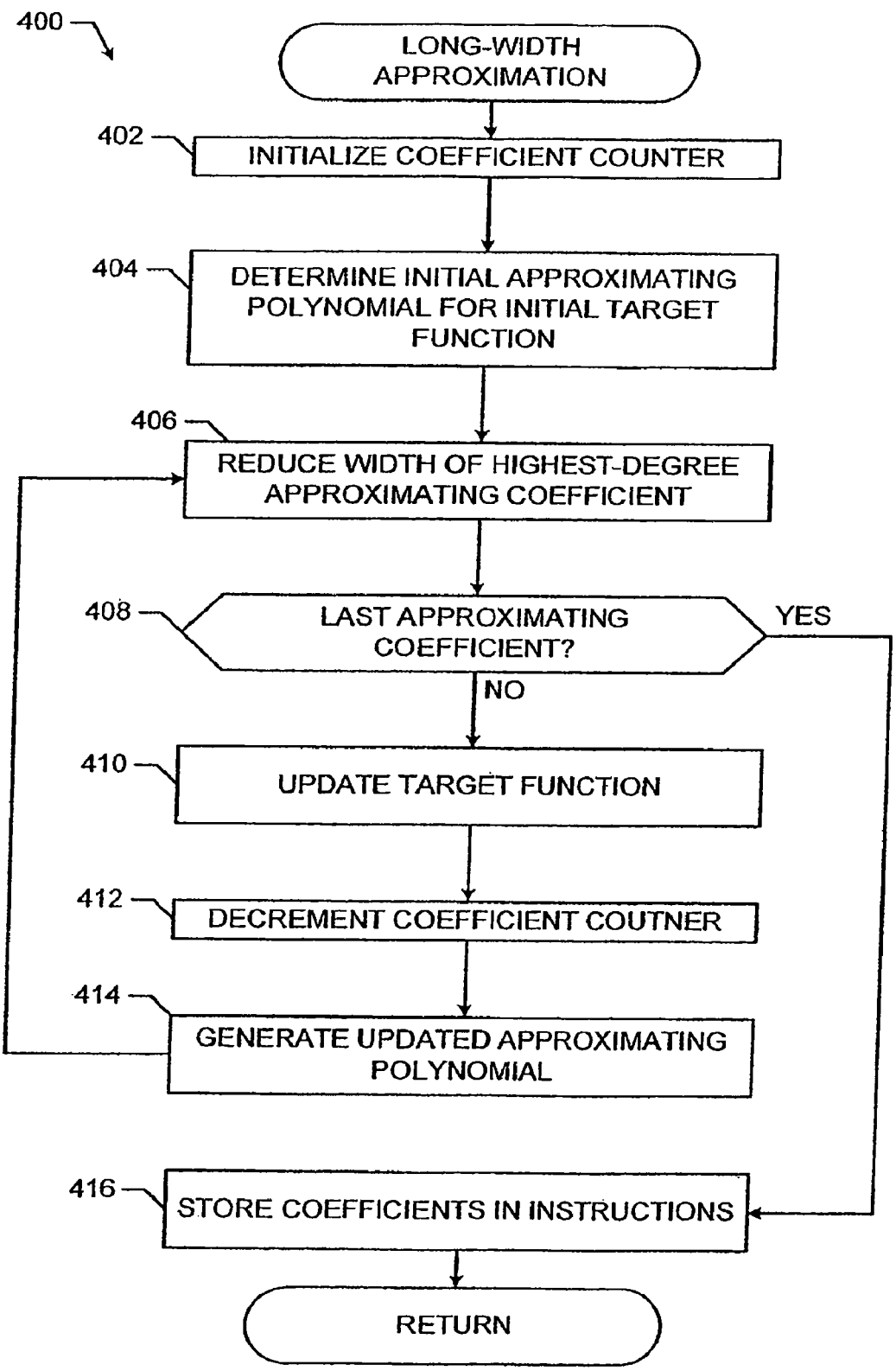
FIG. 4 is a flow diagram of an example long-width approximation method or process that may be used to generate long-width coefficient values associated with a polynomial.

FIG. 4 is a flow diagram of an example long-width approximation method or process 400 that may be used to generate long-width coefficients associated with a polynomial. The example long-width approximation process 400 may be substantially similar or identical to the long-width approximation 110 of FIG. 1 and the long-width approximation 320 of FIG. 3. Additionally, the example long-width approximation process 400 may be implemented using hardware (e.g., the example system 600 of FIG. 6) and/or software stored on a machine accessible medium and executed on a processor system such as, for example, the processor system 710 of FIG. 7. In addition, the example long-width approximation process 400 may be used in combination with the example short-width approximation process 300 of FIG. 3 to generate a mixed-width approximating polynomial having short-width coefficient values and long-width coefficient values.

Long-width coefficient values may be generated based on, for example, approximating coefficient values. Approximating coefficient values may be represented using any number of bits (e.g., 56-bit values, 64-bit values, etc.) Therefore, the approximating coefficient values are converted to long-width coefficient values (e.g., 32-bit values) to reduce the memory space required to store them and to reduce the complexity of calculations that use the long-width coefficient values during a runtime phase (e.g., the runtime phase 106 of FIG. 1).

The long-width coefficient values may be generated based on a coefficient counter $C_w$ and an initial target function such as, for example, the initial target function $f_i(x)$ described in connection with FIG. 3 above. The coefficient counter $C_w$ is substantially similar or identical to the coefficient counter $C_m$ described in connection with FIG. 3 above.

The coefficient counter $C_w$ is initialized (block 402) by setting it equal to a highest-degree value w. The highest-degree value w specifies the degree of the highest-degree approximating coefficient value to be generated for an initial approximating polynomial $p_{li}(x)$. Furthermore, if the example long-width approximation process 400 is used in combination with the example short-width approximation process 300 (FIG. 3), the coefficient counter $C_w$ may be initialized by retrieving the last value of the coefficient counter $C_m$ that was stored in memory at block 318 of FIG. 3, decrementing the value of the coefficient counter $C_m$ by one, and setting the highest-degree value w equal to the result.

An initial approximating polynomial $p_{li}(x)$ is generated (block 404) to approximate the initial target function $f_i(x)$. The number of approximating coefficient values in the initial approximating polynomial $p_{li}(x)$ is defined by the value of the coefficient counter $C_w$ as shown in Equation 6 below.

$$p_{li}(x) = p_0 + p_1 \cdot x + \ldots + p_{w-1} \cdot x^{w-1} + p_w \cdot x^w \quad \text{Equation 6}$$

The data width of the highest-degree approximating coefficient value that is specified by the value of the coefficient counter $C_w$ is reduced to generate a long-width coefficient value (block 406). For example, if the value of the coefficient counter $C_w$ is equal to the highest-degree value w, a long-width coefficient value $p'_w$ is generated based on the approximating coefficient value $p_w$. Any operation such as, for example, rounding, truncating, etc. may be used to generate a long-width coefficient value.

A comparison is performed to determine if any approximating coefficient values remain to be converted to long-width coefficient values (block 408). In particular, the value of the coefficient counter $C_w$ may be compared to the degree of the lowest-degree term of the initial approximating polynomial $p_{li}(x)$. If the value of the coefficient counter $C_w$ is greater than the degree of the lowest-degree term of the initial approximating polynomial $p_{li}(x)$, an updated target function $f_{lu}(x)$ is generated (block 410).

An updated target function $f_{lu}(x)$ is generated (block 410) based on the initial target function $f_i(x)$ and any long-width coefficient values that have been generated. For example, the updated target function $f_{lu}(x)$ includes a long-width coefficient term having the long-width coefficient value $p'_w$ (e.g., $p'_w \cdot x^w$). The long-width coefficient term $p'_w \cdot x^w$ is generated by raising the input argument variable x to the power of the value of the coefficient counter $C_w$ (e.g., $x^w$) and multiplying the result by the long-width coefficient value $p'_w$. The updated target function $f_{lu}(x)$ is then generated by subtracting the long-width coefficient term $p'_w \cdot x^w$ from the initial target function $f_i(x)$ according to Equation 7 below-Equation $$f_{lu}(x) = f_i(x) - p'_w \cdot x^w = \sin(x) - p'_w \cdot x^w \quad \text{Equation 7}$$

As shown in Equation 7, the function sin(x) represents the initial target function $f_i(x)$ and the updated target function $f_{lu}(x)$ equal the function sin(x) minus the product of the long-width coefficient term $p'_w \cdot x^w$.

The coefficient counter $C_w$ is then decremented by one (e.g., w−1) to indicate the degree of the next highest-degree approximating coefficient value (e.g., $p_{w-1}$) (block 412). An updated approximating polynomial $p_{lu}(x)$ is then generated to approximate the updated target function $f_{lu}(x)$ (block 414). The updated approximating polynomial $p_{lu}(x)$ is generated based on the coefficient counter C, and the updated target function $f_{lu}(x)$. The updated approximating polynomial $p_{lu}(x)$ is generated to approximate the updated target function $f_{lu}(x)$ and includes a highest-degree term as indicated by the value of the coefficient counter $C_w$ (e.g., $p_{w-1} \cdot x^{w-1}$) as shown in Equation 8 below.

$$p_{lu}(x) = p_0 + p_1 \cdot x + \ldots p_{w-1} \cdot x^{w-1} \quad \text{Equation 8}$$

After the updated approximating polynomial $p_{lu}(x)$ is generated according to Equation 8 above, control returns to block 406 and the highest-degree approximating coefficient value as indicated by the coefficient counter $C_w$ (e.g., $p_{w-1}$) is converted to a long-width coefficient (e.g., $p'_{w-1}$) (block 406). If it is determined at block 408 that another approximating coefficient value remains to be converted to a long-width coefficient value, another updated target function $f_{lu}(x)$ is generated (block 410). In this manner, the processes of blocks 406, 408, 410, 412, and 414 may be repeated until the lowest-degree approximating coefficient value (e.g., $p_0$) of the initial approximating polynomial $p_{li}(x)$ is converted to a long-width coefficient value.

If it is determined at block 408 that the last approximating coefficient value has been converted to a long-width coefficient value, the reduced-width coefficient values (i.e., the long-width coefficient values generated in connection with the long-width approximation process 400 and the short-width coefficient values generated in connection with the short-width approximation process 300) are stored within instructions in instruction memory (block 416). In particular, code may be written during a design phase (e.g., the design phase 102 of FIG. 1) using the reduced-width coefficient values as immediate data values. In this manner, the immediate data values may be stored within instructions in instruction-memory during a compile phase (e.g., the compile phase 104 of FIG. 1). The reduced-width coefficient values may then be used multiple times during a runtime phase (e.g., the runtime phase 106 of FIG. 1) to represent and evaluate a mixed-width polynomial.

Figure 5:
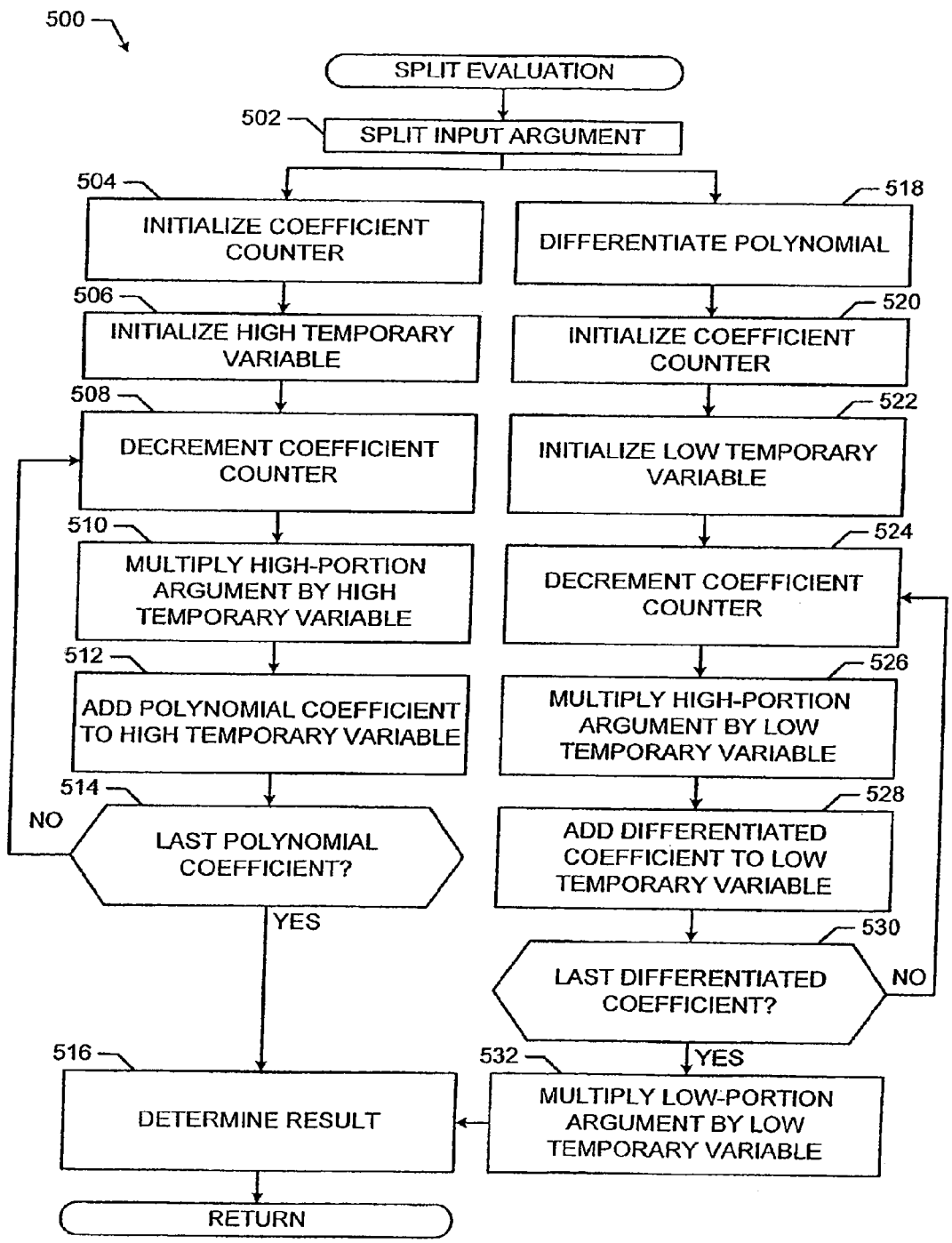
FIG. 5 is a flow diagram of an example split input argument method or process that may be used to evaluate a polynomial.

FIG. 5 is a flow diagram of an example split evaluation method or process 500 that may be used to evaluate a polynomial by splitting an input argument. The example split evaluation process 500 is substantially similar or identical to the split evaluation process 114 of FIG. 1 and may be implemented in hardware such as the example system 600 of FIG. 6 or software that is stored on a machine accessible medium and executed on a processor system such as the processor system 710 of FIG. 7 during a runtime phase (e.g., the runtime phase 106 of FIG. 1). Additionally, the example split evaluation process 500 may be used in combination with the mixed-width coefficient values generated during the short-width approximation process 300 of FIG. 3 and/or the long-width approximation process 400 of FIG. 4.

The polynomial may be an approximating polynomial and/or may include the mixed-width coefficient values generated in connection with the short-width evaluation process 300 of FIG. 3 and the long-width evaluation process of FIG. 4. However, any polynomial may be evaluated using the split evaluation process.

The split evaluation process 500 may be used to evaluate polynomials based on a plurality of reduced-width arguments. In particular, the reduced-width input arguments may be generated by retrieving or receiving an input argument value x for a given polynomial p(x). The input argument value x may be a long value (e.g., a 32-bit value) that requires the use of long instructions to evaluate the polynomial p(x). For example, on an Intel® XScale® processor, evaluating the polynomial p(x) may require long multiplication instructions if the input argument value x and the coefficient values of the polynomial p(x) are greater than 16-bit values. However, the use of short instructions may be enabled by splitting or parsing the input argument value x into a plurality of reduced-width arguments such as, for example, short-width arguments that include 8-bit or 16-bit values, resulting in a faster and more efficient evaluation of the polynomial. For example, as described in greater detail below, if the input argument value x is split into two reduced-width arguments, a polynomial may be evaluated as two parallel evaluation instances. One evaluation instance may evaluate the polynomial based on one of the reduced-width arguments while the other evaluation instance evaluates the polynomial based on the other reduced-width argument.

A polynomial p(x) is evaluated by first receiving or retrieving an input argument value x and splitting or parsing it into a high-portion argument value $x_{HI}$ and a low-portion argument value $x_{LO}$ (block 502). The input argument value x may be split so that at least the high-portion argument value $x_{HI}$ is less than a 16-bit value to ensure that the multiplication of the high-portion argument value $x_{HI}$ and any coefficient of the polynomial p(x) is less than or equal to a 32-bit value. The polynomial p(x) may then be evaluated as two parallel evaluation instances (i.e., a high-portion evaluation and a low-portion evaluation) based on the high-portion argument value $x_{HI}$ and the low-portion argument value $x_{LO}$.

The high-portion evaluation based on the high-portion argument value $X_{HI}$ begins by initializing a coefficient counter $C_h$ (block 504). The coefficient counter $C_h$ is set equal to a polynomial degree value h, which specifies the degree of the highest-degree term of the polynomial p(x). For example, if the polynomial is a fifth-degree polynomial, the polynomial degree value h is equal to five. A high temporary variable P is then initialized and set equal to the highest-degree coefficient value of the polynomial p(x) (e.g., $P=p_h$) (block 506). The highest-degree coefficient value may be identified based on the value of the coefficient counter $C_h$.

The coefficient counter $C_h$ is decremented by one (e.g., h−1) (block 508). The value of the coefficient counter $C_h$ may be used to identify the next coefficient to be added to the value of the high temporary variable P at block 512 below. The high-portion argument value $x_{HI}$ is multiplied by the value of the high temporary variable P (block 510) The multiplication at block 510 may be implemented using a short multiplication instruction to generate the product value $P=p_h \cdot x_{HI}$. Additionally, the result of the multiplication at block 510 is stored in the high temporary variable P by overwriting the previous contents.

The next highest-degree polynomial coefficient of the polynomial p(x) is identified based on the coefficient counter $C_h$ and is added to the value of the high temporary variable P (block 512). The result of the addition (block 512) may be shown as the value $P=p_h \cdot x_{HI}+p_{h-1}$ and is stored in the high temporary variable P. A test is performed to determine if the last polynomial coefficient has been reached (block 514). The test may include a comparison based on the coefficient counter $C_h$ and the degree of the lowest degree term of the polynomial p(x). For example, the constant term (e.g., $p_0$) indicates a lowest degree equal to zero. If at block 514 the value of the coefficient counter $C_h$ is not equal to the degree of the lowest degree term of the polynomial p(x), control is passed back to block 508. In this manner, the processes of blocks 508, 510, 512, and 514 may be repeated until the last coefficient value of the polynomial p(x) has been added to the value of the high temporary variable P to generate a high-portion evaluation result $p(x_{HI})$. On the other hand, if at block 514 the value of the coefficient counter $C_h$ is equal to the lowest degree of the polynomial p(x), the final evaluation result of the polynomial p(x) is determined (block 516) based on the values of the high temporary variable P (i.e., the high-portion evaluation result $p(x_{HI})$ and a low temporary variable Q that is determined in connection with a low-portion evaluation process as described below.

The value of the low temporary variable Q may be determined using a low-portion evaluation process based on the low-portion argument value $X_{LO}$, the high-portion argument value $x_{HI}$, the polynomial p(x), and a coefficient counter $C_q$. The coefficient counter $C_q$ is substantially similar or identical to the coefficient counter $C_h$ described in connection with the high-portion evaluation process above. Additionally, the low-portion evaluation process may be processed in parallel with the high-portion evaluation process.

The polynomial p(x) is differentiated with respect to the argument variable x to generate the differentiated polynomial $$\frac{d}{dx}p(x)$$

(block 518). The coefficient counter $C_q$ is then initialized (block 520) by setting it equal to the differentiated polynomial degree value q, which specifies the degree of the highest-degree term of the differentiated polynomial $$\frac{d}{dx}p(x).$$

The low temporary variable Q is then initialized and is set equal to the highest-degree coefficient value of the differentiated polynomial $$\frac{d}{dx}p(x) (\text{e.g., } Q = p_q)(\text{block } 522).$$

The highest-degree differentiated coefficient value may be identified based on the value of the coefficient counter $C_q$.

The coefficient counter $C_q$ is decremented by one (e.g., q−1) (block 524) and identifies the next differentiated coefficient value to be added to the value of the low temporary variable Q at block 528 below. The high-portion argument value $x_{HI}$ is multiplied by the value of the low temporary variable Q (block 526). The multiplication at block 526 may be implemented using a short multiplication instruction to generate the product value $Q=p_q \cdot x_{HI}$. Additionally, the result of the multiplication (block 526) is stored in the low temporary variable Q by overwriting the previous contents.

The next differentiated coefficient value of the differentiated polynomial $$\frac{d}{dx}p(x)$$

is identified based on the coefficient counter $C_q$ and is added to the value of the low temporary variable Q (block 528). The result of the addition at block 528 may be shown as the value $Q=p_q \cdot x_{HI}+p_{q-1}$ and is stored in the low temporary variable Q. A test is performed to determine if the last differentiated coefficient value has been reached (block 530). The test may include a comparison based on the coefficient counter $C_q$ and the degree of the lowest degree term of the differentiated polynomial $$\frac{d}{dx}p(x).$$

For example, the constant term (e.g., $p_0$) indicates a lowest degree equal to zero. If at block 530 the value of the coefficient counter $C_q$ is not equal to the degree of the lowest degree term of the differentiated polynomial $$\frac{d}{dx} p(x),$$

control returns to block 524. In this manners the processes of blocks 524, 526, 528, and 530 may be repeated until the last differentiated coefficient value of the differentiated polynomial $$\frac{d}{dx} p(x)$$

has been added to the value of the low temporary variable Q.

On the other hand, if at block 530 the value of the coefficient counter $C_q$ is equal to the degree of the lowest degree term of the differentiated polynomial $$\frac{d}{dx} p(x),$$

the low-portion argument value $x_{LO}$ is multiplied by the value of the low temporary variable Q to generate a low-portion evaluation result $$x_{LO} \cdot \frac{d}{dx} p(x_{HI})$$

(block 532). The low-portion evaluation result $$x_{LO} \cdot \frac{d}{dx} p(x_{HI})$$

is stored in the low temporary variable Q and is a correction term for the final result determined at block 516. Additionally, the multiplication at block 532 may be implemented using a short multiplication instruction.

The final evaluation result of the polynomial p(x) is then determined by adding the value of the high temporary variable P to the value of the low temporary variable Q (block 516) as set forth in Equations 9 and 10 below.

$$p(x) = p(x_{HI} + x_{LO}) \quad \text{Equation 9}$$

$$p(x) = p(x_{HI}) + x_{LO} \cdot \frac{d}{dx} p(x_{HI}) + O(x_{LO}^2) \quad \text{Equation 10}$$

Equation 9 represents the evaluation of the polynomial p(x) based on an input argument value x that includes the sum of the high-portion argument value $x_{HI}$ and the low-portion argument value $x_{LO}$. Equation 10 represents the evaluation of the polynomial p(x) as the sum of the high-portion evaluation result $p(x_{HI})$, the low-portion evaluation result or correction term $$x_{LO} \cdot \frac{d}{dx} p(x_{HI}),$$

and an order of magnitude term $O(x_{LO}^2)$.

The order of magnitude term $O(x_{LO}^2)$ specifies the amount of error introduced into the approximation of the polynomial p(x) in terms of $x_{HI}$ and $x_{LO}$. More specifically, the order of magnitude term $O(x_{LO}^2)$ is associated with the amount of error incurred by ignoring terms beyond a highest-approximating term $$\left( \text{e.g., } x_{LO} \cdot \frac{d}{dx} p(x_{HI}) \right).$$

For example, the exact Taylor expansion used to express the polynomial p(x) in terms of $x = x_{HI} + x_{LO}$ may be expressed as set forth in Equation 11 below.

$$p(x) = p(x_{HI}) + x_{LO} \cdot \frac{d}{dx} p(x_{HI}) + \frac{x_{LO}^2}{2} \cdot \frac{d}{dx} p(x_{HI}) + \frac{x_{LO}^3}{6} \cdot \frac{d^2}{dx^2} p(x_{HI}) + \ldots \quad \text{Equation 11}$$

The error of truncating the terms $$\frac{x_{LO}^2}{2} \cdot \frac{d}{dx} p(x_{HI}), \frac{x_{LO}^3}{6} \cdot \frac{d^2}{dx^2} p(x_{HI}),$$

etc. shown in Equation 11 above is specified by a value proportional to $x_{LO}^2$ and is expressed as the order of magnitude $O(x_{LO}^2)$.

The amount of error in the result, as expressed by the order of magnitude term $O(x_{LO}^2)$, is relatively small. As a result, the order of magnitude term $O(x_{LO}^2)$ may be cancelled in the evaluation to yield an approximation of the polynomial p(x) as set forth in Equation 12 below.

$$p(x) \approx p(x_{HI}) + x_{LO} \cdot \frac{d}{dx} p(x_{HI}) \quad \text{Equation 12}$$

Figure 6:
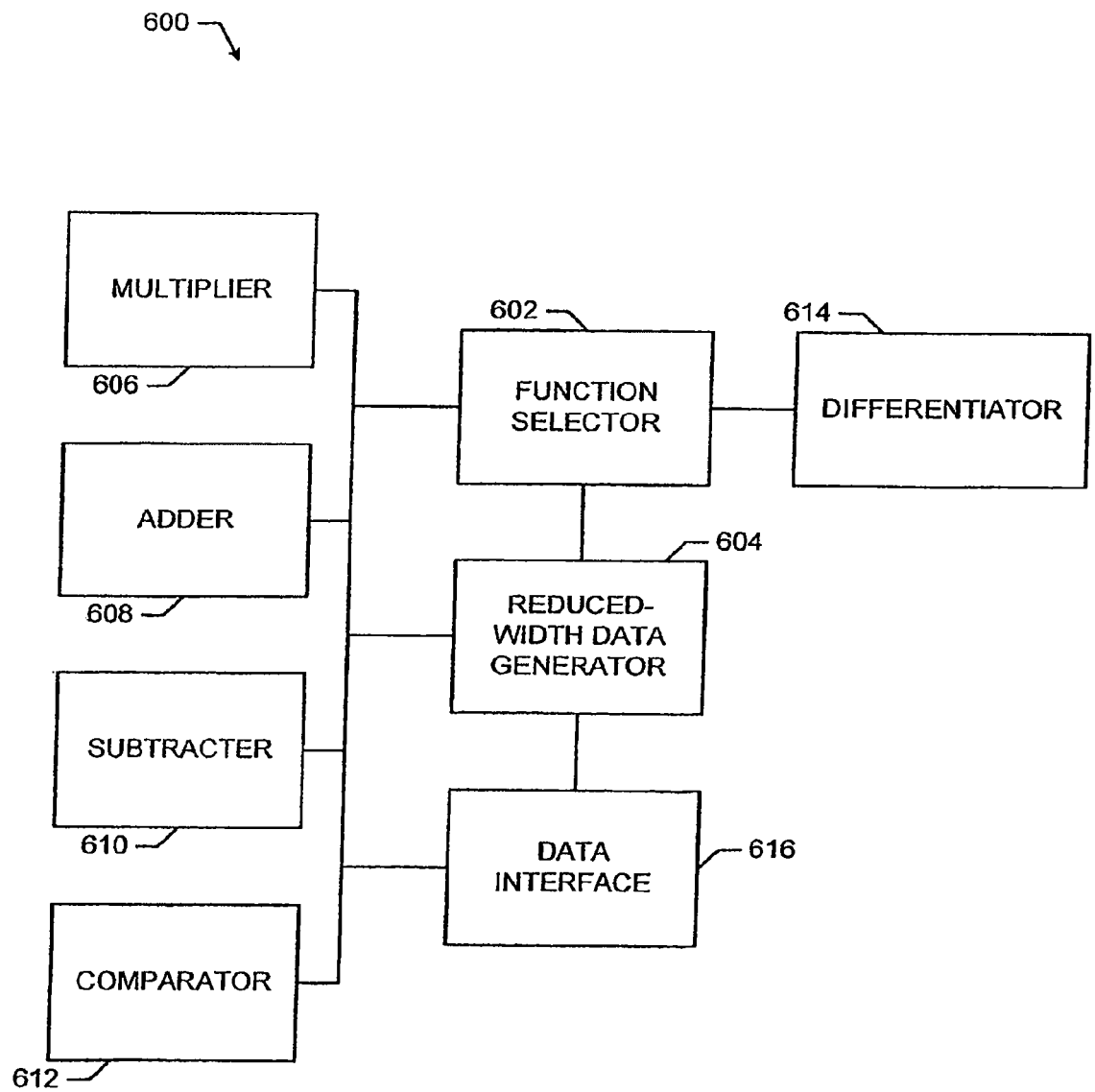
FIG. 6 is a functional block diagram of an example system that may be used to implement the methods described herein.

FIG. 6 is a functional block diagram of an example system that may be used to implement the processes described herein. The structures shown in FIG. 6 may be implemented using any desired combination of hardware and/or software. For example, one or more integrated circuits, discrete semiconductor components, or passive electronic components may be used, Additionally or alternatively, some or all, or parts thereof, of the structures of FIG. 6 may be implemented using instructions, code, or other software and/or firmware, etc. stored on a machine accessible medium that, when executed by, for example, a processor system (e.g., the processor system 710 of FIG. 7), perform the methods disclosed herein (e.g., the methods described in connection with FIGS. 1 through 5).

In general, the example system 600 uses a function generator or selector to generate a plurality of functions within a design phase (e.g., the design phase 102 of FIG. 1), a runtime phase (e.g., the runtime phase 106 of FIG. 1), or any other phase or operational state of the example system 600 or the processor system 710 (FIG. 7). As a result, the example system 600 may be used, for example, to generate target functions (e.g., transcendental functions, algebraic functions, etc.) and polynomials, which may include approximating polynomials.

In some cases, the example system 600 generates approximating polynomials that approximate target functions (e.g., $p_t(x) \approx f_t(x) = \sin(x)$). The example system 600 may then perform comparisons based on the approximating polynomials and the target functions to determine an accuracy of the approximating polynomial. Additionally, the example system 600 generates reduced-width data values that may be stored with instructions in instruction memory during a compile phase (e.g., the compile phase 104 of FIG. 1). The reduced-width data values may include the short-width coefficient values described in connection with FIG. 3 above, the long-width coefficient values described in connection with FIG. 4 above, and the split input argument values described in connection with FIG. 5 above. Furthermore, the reduced-width data values may enable the use of short instructions to evaluate functions during, for example, the runtime phase 106 (FIG. 1). The example system 600 may also be configured to evaluate a function by, for example, parsing or splitting an input argument value as described in connection with FIG. 5 above and using parallel evaluation processes to evaluate the function.

Now turning in detail to FIG. 6, the example system 600 includes a function selector 602, a reduced-width data generator 604, a multiplier 606, an adder 608, a subtracter 610, a comparator 612, a differentiator 614, and a data interface 616, all of which may be communicatively coupled as shown. The function selector 602 may be configured to select target functions and/or polynomials by retrieving or receiving them from, for example, a memory location or by generating them. For example, the fiction selector 602 may retrieve target functions such as the target function $f_t(x)=\sin(x)$ used in the example methods of FIGS. 3 and 4. Additionally, the function selector 602 may generate approximating polynomials having any desired number of approximating coefficient values. Furthermore, the function selector 602 may be configured to retrieve, receive, and/or generate any mathematical functions described in connection with FIGS. 3, 4, and 5. The function selector 602 is communicatively coupled to the reduced-width data generator 604 and provides coefficient values to the reduced-width data generator 604. Additionally, the function selector 602 is communicatively coupled to the multiplier 606, the adder 608, the subtracter 610, the comparator 612, and the differentiator 614 and, thus, may be configured to provide functions to the same.

As shown in FIG. 6, the reduced-width data generator 604 is communicatively coupled to the function selector 602, the multiplier 606, the adder 608, the subtracter 610, and the data interface 616. The reduced-width data generator 604 obtains coefficient values from the function selector 602 and input argument values from the data interface 616. The reduced-width data generator 604 may be configured to generate reduced-width data values based on the coefficient values and the input argument values. For example, the reduced-width data generator 604 may generate reduced-width coefficient values (e.g., the short-width and long-width coefficient values described in connection with FIGS. 3 and 4 above) based on the coefficient values obtained from the function selector 602 by, for example, rounding or truncating the coefficient values. Additionally, the reduced-width data generator 604 may generate a plurality of reduced-width input argument values based on the input argument values obtained from the data interface 616 by, for example, splitting or parsing the input argument values.

The reduced-width data generator 604 may also be configured to provide reduced-width data values to the function selector 602, the multiplier 606, the adder 608, the subtracter 610, and the data interface 616. In particular, the function selector 602 may be configured to generate functions such as, for example, the updated target functions $f_{su}(x)$, $f_{lu}(x)$ and the updated approximating polynomials $p_{su}(x)$, $p_{lu}(x)$ described in greater detail in connection with FIGS. 3 and 4 based on at least some of the reduced-width data values (e.g., the reduced-width coefficient values).

The multiplier 606, the adder 608, and the subtracter 610 may be configured to obtain functions from the function selector 602, reduced-width data values from the reduced-width data generator 604, and input argument values from the data interface 616. More specifically, the multiplier 606, the adder 608, and the subtracter 610 may be configured to evaluate the functions obtained from the function selector 602 based on the reduced-width data values obtained from the reduced-width data generator 604 and the input arguments received from the data interface 616. In one example, as described in greater detail in connection with FIGS. 3 and 4, the multiplier 606, the adder 608, and the subtracter 602 may be configured to evaluate updated approximating polynomials $p_{su}(x)$ and $p_{lu}(x)$ based on a value or range of values for the input argument variable x.

The multiplier 606, the adder 608, and the subtracter 610 may provide evaluation values of functions to the comparator 612. The comparator 612 may be configured to compare the evaluation value of one function to the evaluation value of another function. For example, as described in greater detail in connection with FIG. 2, the comparator 612 may be configured to compare the approximating accuracy of an approximating polynomial that approximates a target function by comparing the evaluation values of the approximating polynomial and the target function over a range of input argument values and determining a maximum deviation (e.g., the maximum deviation 210 of FIG. 2).

The differentiator 614 may obtain functions from the function selector 602 such as, for example, polynomials, which may include approximating polynomials and calculate the derivative of the functions to generate differentiated functions (e.g., differentiated polynomials). Additionally, the differentiator 614 may provide the differentiated functions to the function selector 602 for further processing.

The data interface 616 may obtain reduced-width coefficient values from the reduced-width generator 604 and store the reduced-width coefficient values in a memory during, for example, the compile phase 104 (FIG. 1). The data interface 616 may then retrieve the reduced-width coefficient values from the memory during, for example, the runtime phase 106 (FIG. 1). Additionally, the data interface 616 may provide input argument values to the multiplier 606, the adder 608, the subtracter 610, and the comparator 612 during the runtime phase 106.

FIG. 7 is a block diagram of an example processor system 710 that may be used to implement the apparatus and methods described herein. As shown in FIG. 7, the processor system 710 includes a processor 712 that is coupled to an interconnection bus or network 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection network or bus 714. The processor 712 may be any suitable processor, processing unit or microprocessor such as, for example, a processor from the Intel X-Scale™ family, the Intel Pentium™ family, etc. In the example described in detail below, the processor 712 is a thirty-two bit Intel processor, which is commonly referred to as an IA-32 processor. Although not shown in FIG. 7, the system 710 may be a multi-processor system and, thus, may include one or more additional processors that are identical or similar to the processor 712 and which are coupled to the interconnection bus or network 714.

The processor 712 of FIG. 7 is coupled to a chipset 718, which includes a memory controller 720 and an input/output (I/O) controller 722. As is well known, a chipset typically provides I/O and memory management functions as well as a plurality of general purpose and/or special purpose registers, timers, etc. that are accessible or used by one or more processors coupled to the chipset. The memory controller 720 performs functions that enable the processor 712 (or processors if there are multiple processors) to access a system memory 724 and a non-volatile memory 725.

The system memory 724 may include any desired type of volatile memory such as, for example, static random access memory (SRAM), dynamic random access memory (DRAM), etc. The non-volatile memory 725 may include any desired type of non-volatile memory such as flash memory or read-only memory (ROM).

The I/O controller 722 performs functions that enable the processor 712 to communicate with peripheral input/output (I/O) devices 726 and 728 via an I/O bus 730. The I/O devices 726 and 728 may be any desired type of I/O device such as, for example, a keyboard, a video display or monitor, a mouse, etc. While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

The methods described herein may be implemented using instructions stored on a machine accessible medium (e.g., a computer accessible medium) that are executed by the processor 712. The machine accessible medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of determining an evaluation result of a polynomial, the method comprising:
    determining a plurality of reduced-width values from an input argument value;
    determining a plurality of evaluation values associated with the polynomial based on the plurality of reduced-width values, at least one of the plurality of evaluation values being determined based on one of the plurality of reduced-width values independent of a remainder of the plurality of reduced-width values;
    determining the evaluation result of the polynomial based a commutative operation performed on a processing device with the plurality of evaluation values; and
    utilizing the evaluation result for a processing application.

2. The method of claim 1, wherein a sum of the plurality of reduced-width values is equal to the input argument value.

3. The method of claim 1, wherein determining the plurality of evaluation values comprises determining a product of at least one of the plurality of reduced-width values and at least one coefficient of the polynomial.

4. The method of claim 3, wherein the product is determined using a short multiplication instruction.

5. The method of claim 1, wherein determining the plurality of evaluation values comprises differentiating the polynomial.

6. The method of claim 1, wherein determining the plurality of evaluation values comprises determining a correction term value.

7. The method of claim 1, wherein the commutative operation performed with the plurality of evaluation values comprises a summation of the plurality of evaluation values.

8. A computer-readable storage medium storing a computer program that includes instructions for determining an evaluation result of a polynomial, the instructions causing a processor to:
    reduce an input argument value into a plurality of reduced-width values;
    determine a plurality of evaluation values associated with the polynomial based on the plurality of reduced-width values, at least one of the plurality of evaluation values being determined based on one of the plurality of reduced-width values independent of a remainder of the plurality of reduced-width values;
    determine the evaluation result of the polynomial based on a commutative operation performed with the plurality of evaluation values; and
    utilize the evaluation result for a processing application executed on the processor.

9. The computer-readable storage medium of claim 8, wherein a sum of the plurality of reduced-width values is equal to the input argument value.

10. The computer-readable storage medium of claim 8 further comprising instructions for causing the processor to determine the plurality of evaluation values by determining a product of at least one of the plurality of reduced-width values and at least one coefficient of the polynomial.

11. The computer-readable storage medium of claim 10 wherein the product is determined using a short multiplication instruction.

12. The computer-readable storage medium of claim 8 further comprising instructions for causing the processor to determine the plurality of evaluation values by differentiating the polynomial.

13. The computer-readable storage medium of claim 8, wherein a correction term value is associated with the plurality of evaluation values.

14. The computer-readable storage medium of claim 8, wherein the commutative operation performed with the plurality of evaluation values comprises a summation of the plurality of evaluation values.

15. An apparatus for determining an evaluation result of a polynomial, the apparatus comprising:
    a reduced-width data generator configured to generate a plurality of reduced-width values from an input argument value; and
    evaluation circuitry in communication with the reduced-width data generator and configured to generate a plurality of evaluation values associated with the polynomial based on the plurality of reduced-width values and to determine the evaluation result of the polynomial based on a commutative operation performed with the plurality of evaluation values, at least one of the plurality of evaluation values being determined based on one of the plurality of reduced-width values independent of a remainder of the plurality of reduced-width values.

16. The apparatus of claim 15, wherein a sum of the plurality of reduced-width values is equal to the input argument value.

17. The apparatus of claim 15, wherein the evaluation circuitry determines the plurality of evaluation values based on a determination of a product of at least one of the plurality of reduced-width values and at least one coefficient of the polynomial using a short multiplication instruction.

18. The apparatus of claim 15, wherein the plurality of evaluation values is determined by differentiation of the polynomial.

19. The apparatus of claim 15, wherein a correction term value is associated with the plurality of evaluation values.

20. The apparatus of claim 15, wherein the commutative operation performed with the plurality of evaluation values comprises a summation of the plurality of evaluation values.

* * * * *